(12) United States Patent
Thissen et al.

(10) Patent No.: US 7,469,179 B2
(45) Date of Patent: Dec. 23, 2008

(54) LONGITUDINAL DYNAMIC CONTROL DEVICE FOR MOTOR VEHICLES

(75) Inventors: Sonja Thissen, Munich (DE); Rainer Faller, Fischbachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/729,930

(22) Filed: Mar. 30, 2007

(65) Prior Publication Data

US 2007/0173985 A1  Jul. 26, 2007

Related U.S. Application Data

(63) Continuation of application No. PCT/EP2005/009607, filed on Sep. 7, 2005.

(30) Foreign Application Priority Data

Oct. 1, 2004  (DE) .................. 10 2004 047 925

(51) Int. Cl.
*B60K 31/04* (2006.01)
(52) U.S. Cl. ........................................ 701/70
(58) Field of Classification Search ................ None
See application file for complete search history.

(56) References Cited

U.S. PATENT DOCUMENTS

| | | | | | |
|---|---|---|---|---|---|
| 4,522,280 | A | * | 6/1985 | Blaney | ............ 180/175 |
| 4,921,063 | A | | 5/1990 | Masuda | |
| 5,486,808 | A | * | 1/1996 | Nejdl | ............ 340/464 |
| 5,781,103 | A | * | 7/1998 | Gilling | ............ 340/441 |
| 6,198,397 | B1 | * | 3/2001 | Angert et al. | ............ 340/576 |
| 6,353,788 | B1 | * | 3/2002 | Baker et al. | ............ 701/96 |
| 6,502,019 | B1 | | 12/2002 | Zydek et al. | |
| 6,622,071 | B2 | | 9/2003 | Reuter | |
| 6,918,064 | B2 | | 7/2005 | Mueller et al. | |
| 7,039,515 | B2 | * | 5/2006 | Eich et al. | ............ 701/51 |
| 7,051,827 | B1 | * | 5/2006 | Cardinal et al. | ............ 180/174 |
| 2002/0040269 | A1 | | 4/2002 | Billig et al. | |
| 2002/0194551 | A1 | | 12/2002 | Mueller et al. | |
| 2006/0191730 | A1 | * | 8/2006 | Alden et al. | ............ 180/272 |

FOREIGN PATENT DOCUMENTS

| | | |
|---|---|---|
| DE | 37 37 697 A1 | 5/1989 |
| DE | 39 05 479 A1 | 10/1989 |
| DE | 198 00 311 A1 | 7/1999 |

(Continued)

*Primary Examiner*—Michael J. Zanelli
(74) *Attorney, Agent, or Firm*—Crowell & Moring LLP

(57) ABSTRACT

A longitudinal dynamics management device for vehicles is provided, the device having at least one first function unit which performs predetermined driving functions by output of a longitudinal dynamics management setpoint value, and a second function unit which is independent of the first function unit. The safety functions of the second function unit are performed independently of internal operands of the first function unit. The safety functions include acceleration monitoring and/or monitoring of jolts. With acceleration monitoring, a check is performed to ascertain whether the actual vehicle acceleration and/or the expected acceleration resulting from the setpoint value is independent of a setpoint vehicle acceleration, within an acceleration range regarded as controllable by the driver. With jolt monitoring, a check is performed to ascertain whether the change in actual vehicle acceleration and/or the expected change in vehicle acceleration is within a range regarded as controllable by the driver.

10 Claims, 2 Drawing Sheets

FOREIGN PATENT DOCUMENTS

| | | |
|---|---|---|
| DE | 198 46 820 A1 | 4/2000 |
| DE | 199 60 782 A1 | 6/2001 |
| DE | 100 45 892 A1 | 3/2002 |
| DE | 100 48 251 A1 | 4/2002 |
| DE | 101 13 917 A1 | 9/2002 |
| EP | 0 992 388 B1 | 4/2000 |
| FR | 2 843 341 A1 | 2/2004 |
| JP | 62-53238 * | 3/1987 |

* cited by examiner

LONGITUDINAL DYNAMIC CONTROL DEVICE FOR MOTOR VEHICLES

This application is a Continuation of PCT/EP2005/009607, filed Sep. 7, 2005, and claims the priority of German Patent Application DE 10 2004 047 925.9, filed Oct. 1, 2004, the disclosures of which are expressly incorporated by reference herein.

BACKGROUND AND SUMMARY OF THE INVENTION

The invention relates to a longitudinal dynamics control device for motor vehicles.

Such a longitudinal dynamics management device is known from German patent document DE 199 60 782 A1, for example. This patent describes a form of acceleration monitoring by comparing an actual acceleration with an ideal acceleration.

In addition, a longitudinal dynamics management device in the form of a cruise control unit having an interference immunity circuit is also known from German patent document DE 39 05 479 C2.

Both known devices use a form of error recognition which recognizes a malfunction of the longitudinal dynamics management device and optionally executes a safety function on occurrence of a malfunction. With these known longitudinal dynamics management devices, error recognition is combined with the cruise control functions.

A longitudinal dynamics management device here is understood to refer to any longitudinal dynamics regulating system or longitudinal dynamics management system (hereinafter abbreviated simply as LDM system) that can be used as a comfort system for driver assistance.

The object of the present invention is to provide longitudinal dynamics management devices with safety functions that are as simple as possible but operate as reliably as possible.

This object is achieved according to this invention by the subjects of the independent patent claims. Advantageous refinements are the subjects of the dependent patent claims. In addition, it is pointed out that the subjects of the independent patent claims may also be combined with one another.

The invention is based on the following findings:

For example, cruise control systems as longitudinal dynamics management systems with a safety concept are known, combining safety functions with cruise control functions, hereinafter referred to as generally valid driving functions for longitudinal dynamics management devices. With these concepts, local error recognition measures and safety functions should thus be independent of the algorithm of the driving functions. The subject of German patent document DE 39 05 479 C2, which was already cited above, is an example of this.

This combination of driving functions with safety functions requires a novel adaptation of safety functions to the driving functions when there is a change in driving functions.

Therefore, the first basic idea is to separate the safety functions from the driving functions that are classified as non-safety-relevant. The driving functions are executed in a first function unit (driving function unit) using a main computer. The driving functions may already be partially protected by limiting functions on the main computer. However, it is important for the safety functions to be performed fundamentally in an independent second function unit (safety function unit) which also comprises either the main computer or its own monitoring computer. The two function units which operate separately may, but need not, be integrated into a common controller. The term function unit is understood in particular to refer to a software module in a controller by which certain functions can be triggered in the vehicle by using the controller hardware and other vehicle components.

A safety-relevant subsystem comprising software (function unit), hardware (hardware of the controller into which the function unit is integrated) and other vehicle components, e.g., other electronic controllers, is created by the second function unit. This subsystem coincides with the risk scenarios identified in a risk analysis.

Another basic idea is that monitoring is of primary concern with regard to safety functions and should be as independent as possible of the driving functions in contrast with maintaining target variables and actual variables according to German patent document DE 199 60 782 A1. The second basic idea of the safety concept may be independent of or dependent on the first basic idea. The goal of the second basic idea is to ascertain the controllability of the respective state of the vehicle by the driver and prevent uncontrollable states. This determination is performed by using safety functions based on the change in dynamic quantities of the vehicle which are independent of the operands of the longitudinal dynamics management device as they pertain to the driving functions. The safety functions include plausibility checks on input signals which are independent of the driving functions. The safety functions are preferably as different from one another as possible and are as different as possible from the driving functions (functional diversity).

The safety functions as a function of the change in dynamic variables of the vehicle, and the regulated variables of the longitudinal dynamics management device pertaining to the driving functions, preferably include in particular an acceleration monitoring and/or monitoring of jolts. As part of acceleration monitoring, in a first alternative, there is monitoring to ascertain whether safety technical limits in changes in vehicle speed are maintained or, in a second alternative, which is especially advantageous because it is preventive, there is monitoring with regard to vehicle dynamics that are controllable by the driver to ascertain whether the safety technical limits to changes in vehicle speed to be expected on the basis of the change in the longitudinal dynamics management setpoint are maintained. As part of the monitoring of jolts, in a first alternative, there is monitoring to ascertain whether the safety technical limits in the instantaneous vehicle acceleration or, in a second alternative, which is especially advantageous because it is preventive, there is monitoring to ascertain whether the safety technical limits to changes in acceleration that are to be expected on the basis of the change in the longitudinal dynamics management setpoint value have been maintained with regard to vehicle dynamics controllable by the driver. The acceleration monitoring and monitoring of jolts may also be performed independently of the separation into two function units. The alternatives of acceleration monitoring and monitoring of jolts may be combined together in any desired form.

The functions performed with longitudinal dynamics management devices, i.e., so-called LDM systems, include in particular driver assistance functions, which are presented to the driver in the form of longitudinal controls as speed-based vehicle responses (e.g., cruise control or adaptive cruise control functions).

The goal of the safety functions is to control risks that can occur due to errors in the LDM driving functions for the driver. The errors to be assumed can be ascertained with the help of risk analysis and FMEA (error possibility and error influence analysis).

Safety goals include in particular:

Without driver activation, LDM must not result in any defective critical triggering of the actuators.

In the state activated by the driver, the vehicle acceleration must remain within a range that is controllable by the driver.

Decisive intervention by the driver into the vehicle performance must be ensured.

The vehicle must not be destabilized by an LDM intervention.

The safety goals defined above are implemented by safety functions. The safety functions are not usually assigned to just one safety goal. In the present invention, as mentioned above, acceleration monitoring and monitoring of jolts are of primary concern as safety functions, as explained in greater detail below:

1. (Vehicle) Acceleration monitoring

This monitoring is based on the vehicle acceleration generated by the driving functions and it monitors this driving function for whether or not controllable limits are being observed. The controllability of the vehicle response is determined by the change in the prevailing speed of the vehicle, among other things. This monitoring may be implemented by monitoring the measured acceleration applied to the vehicle and monitoring same with respect to an acceleration range regarded as being controllable by the driver (such ranges may be predetermined, e.g., by specifications and standards).

If there is no input signal from an acceleration sensor, then an actual vehicle acceleration can be generated, e.g., from a vehicle speed signal and/or the wheel rotational speeds measured for a brake control system in the function unit that is performing the acceleration monitoring. Furthermore, the term "vehicle acceleration" is also understood to include any quantity proportional to the vehicle acceleration. The monitoring is preferably active only when the instantaneous vehicle acceleration results from the LDM driving function to be monitored. In other words, the driver should always be given an opportunity to override the function on his own responsibility, just as acceleration/deceleration requests by other systems should lie within their responsibility.

Alternatively or additionally, the acceleration monitoring may be implemented in a preventive manner through the monitoring of the vehicle acceleration (which still cannot be measured) that would be expected if the predetermined longitudinal dynamics management setpoint value were in fact to be implemented.

2. Monitoring of jolts

In addition to a change in speed, the change in acceleration (jolt) has a significant influence on the controllability of the vehicle.

2a (First alternative): Acceleration gradient monitoring

The actual change in vehicle acceleration is analyzed here with regard to controllability by the driver.

2b (Second alternative): Setpoint value gradient monitoring and/or torque gradient monitoring This monitoring is based on the gradient of the longitudinal dynamics management setpoint value, in particular the gradient of the drive request or brake torque request output by an LDM driving function and limits the effects thereof on the acceleration to a limit value that is still controllable by the driver and/or is still to be appraised as comfortable by the driver. The coordination of this setpoint value gradient limit value is ascertained empirically, e.g., by evaluating the vehicle response caused by the setpoint value gradient, in particular a change in acceleration, and this is then stored in the function unit.

The acceleration monitoring and the monitoring of jolts together form the frame within which the driving function may vary in the state activated by the driver. In particular, sudden drive interventions or braking interventions are to be prevented. The "violent jolt" that is to be prevented, is relative and is designed in particular with regard to controllability.

By monitoring the actual vehicle response (actual acceleration) longer-lasting changes in vehicle speed are monitored. Shorter changes in the setpoint value that would lead to jerky changes in vehicle speed are monitored by monitoring the setpoint value (setpoint value gradient monitoring). These changes are prevented by the present invention before such jumps in setpoint value as a vehicle response can have any effect at all (preventive).

3. Monitoring of output

In addition to monitoring of acceleration and monitoring of jolts, the reliability of a setpoint output can also be monitored as an additional safety function because the output of setpoint values may no longer be controllable by the driver because they are linked to certain operating states. Then the reliability of the longitudinal dynamics management setpoint value, in particular of a driving torque or braking torque request, is preferably monitored for conformity to the activation requested by the driver. In other words, if an operating unit that is to be operated manually and is assigned to the longitudinal dynamics management device does not supply an activation signal (activation request by the driver) for the longitudinal dynamics management device to the function unit, then output of a longitudinal dynamics management setpoint value, in particular of a driving or braking torque request, is recognized as inadmissible.

Other monitoring may also be performed in addition, e.g., monitoring of the driver's decisive intervention. The goal of monitoring the driver's decisive intervention is to ensure that the driver can fulfill his responsibility for the vehicle performance and can intervene correctly at any time. In particular, the setpoint value requests of the driving function are checked for contradictions with the driver's intent via the pedal system and prevent any contradictions.

The basic ideas of this invention are summarized briefly:

1. Separation of driving function unit and safety function unit, whereby the safety functions are executed independently of the internal operands of the driving function unit and/or 2. Safety functions independent of the vehicle response (current) and the setpoint value (preventive) and/or 3. Acceleration monitoring based on the vehicle response (current) and/or setpoint value (preventive) and/or 4. Monitoring of jolts based on the vehicle response (current) and/or the setpoint value (preventive).

Other objects, advantages and novel features of the present invention will become apparent from the following detailed description of the drawings when considered in conjunction with the accompanying drawings.

DETAILED DESCRIPTION

Figure 1:
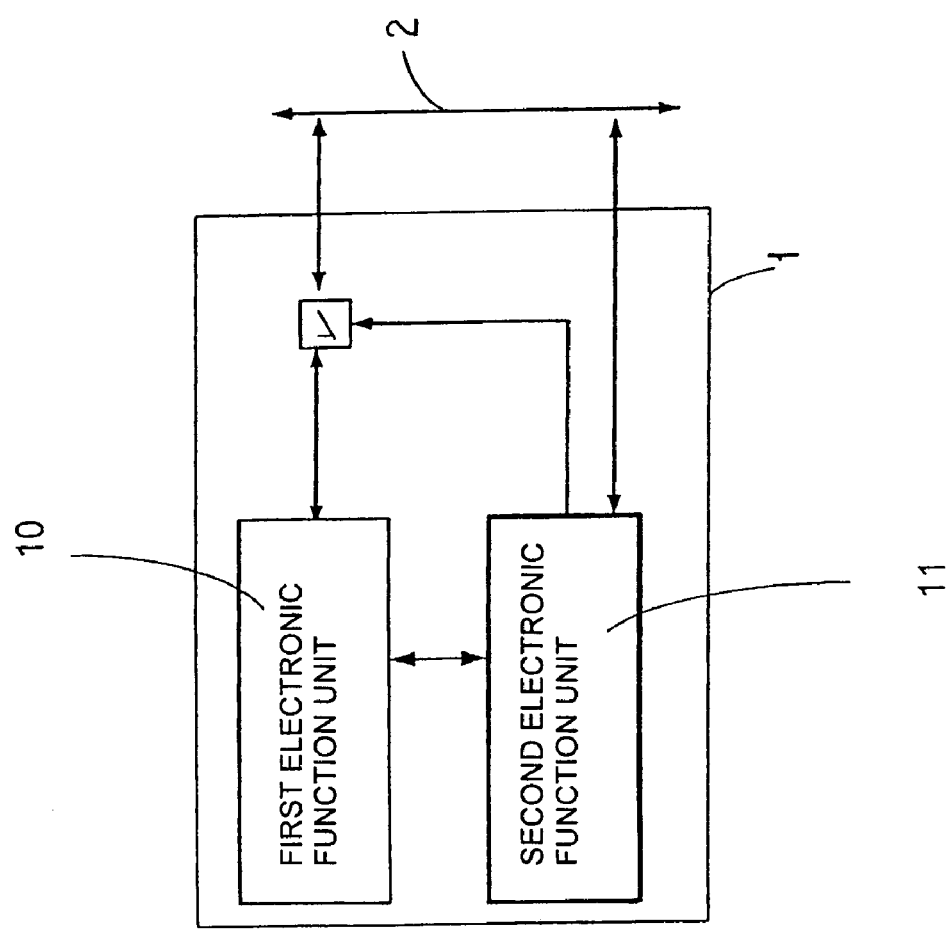
FIG. 1 shows one possible diagram of an embodiment of the longitudinal dynamics management device having a first and a second function unit.

FIG. 1 shows a controller LDM 1 for a longitudinal dynamics management device for motor vehicles having a first electronic function unit 10 and a second function unit 11 that is independent of the first function unit 10. The two function units 10 and 11 preferably communicate with one another and with sensors, actuators and other controllers via a databus 2. The function units 10 and 11 could also be integrated into different controllers.

Figure 2:
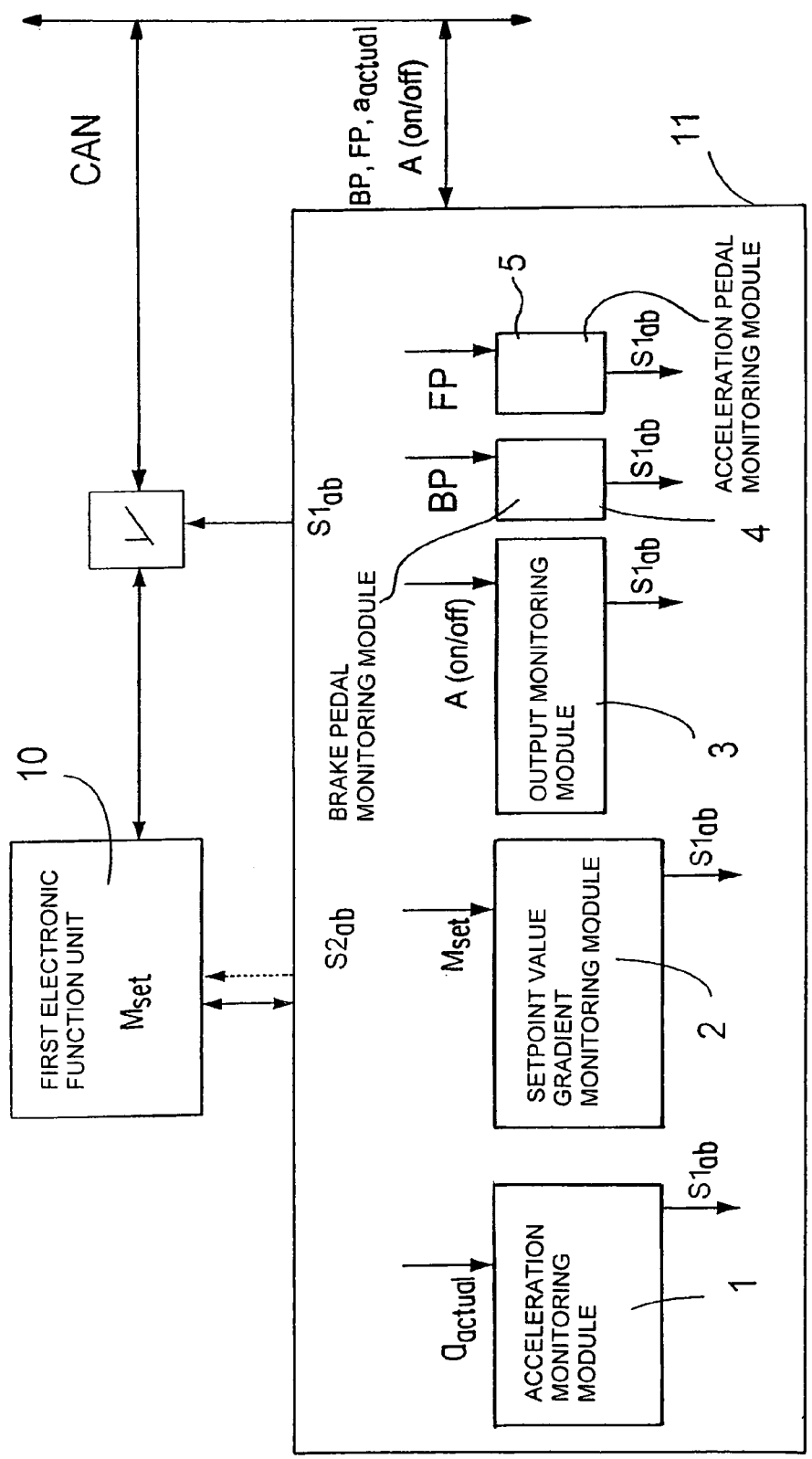
FIG. 2 shows details of the second function unit of FIG. 1.

FIG. 2 shows in greater detail the LDM control shown only as an overview in FIG. 1. The first electronic function unit 10 is responsible for the driving functions mentioned above and outputs a longitudinal dynamics management setpoint value as an output signal in the form of a driving torque or braking torque demand $M_{set}$. Since these driving functions are the state of the art, they are not described further here. This longitudinal dynamics management setpoint value $M_{set}$ is an input signal of the second function unit 11 which is responsible for the safety functions. The second function unit 11 does not receive an intermediate value from the function unit 10 but instead is independent of the internal operands and the algorithms performed in the function unit 10. Over the databus CAN that is external to the controller, the second function unit 11 receives as additional input signals in particular the actual acceleration $a_{actual}$ of the vehicle or signals by means of which the actual acceleration $a_{actual}$ of the vehicle can be ascertained. Other input signals include, for example, the accelerator pedal angle FP, a brake pedal signal BP and an activation signal A from a manually operated operating part assigned to the LDM system by means of which the activation request A=on or the deactivation request A=off by the driver, based on the LDM system, is delivered to the function unit 11.

The second function unit 11 contains an acceleration monitoring module 1, a setpoint value gradient monitoring module 2, an output monitoring module 3, a brake pedal monitoring module 4 and an accelerator pedal monitoring module 5.

A check is performed in the acceleration monitoring module 1 to ascertain whether the actual acceleration $a_{actual}$ is within an acceleration range that is regarded as controllable by the driver, independently of the setpoint acceleration, said range being stored in the second function unit 11, for example (acceleration monitoring). Preventive acceleration monitoring via setpoint value monitoring is not depicted in the present example, but it could also be provided additionally or alternatively.

A check is performed in the setpoint value gradient monitoring module 2 to ascertain whether the gradient of the longitudinal dynamics management setpoint value $M_{set}$ is greater than a predetermined threshold value (setpoint value gradient monitoring and/or torque gradient monitoring for preventive monitoring of jolts). Monitoring of jolts via an acceleration gradient monitoring is not depicted in the present example but it could also be provided additionally or alternatively.

A check is performed in the output monitoring module 3 to ascertain whether the output of a longitudinal dynamics management setpoint value $M_{set}$ is admissible on the basis of an activation request by the driver and other possible conditions, i.e., whether an operating unit (operating part) that is to be operated manually and is assigned to the longitudinal dynamics management device has supplied the function unit 11 with an input signal A=on for the longitudinal dynamics management device and whether other systems are communicating their availability (output monitoring).

The second function unit 11 outputs, for example, either a shutdown signal $S1_{ab}$ to the CAN or a shutdown signal $S2_{ab}$ directly to the first function unit 10 to prevent implementation of the longitudinal dynamics management setpoint value $M_{set}$ currently being output when the actual acceleration $a_{actual}$ is outside of the acceleration range regarded as being controllable by the driver, when the gradient of the longitudinal dynamics management setpoint value is greater than a predetermined threshold value or when a valid setpoint value has been output, although an operating unit (operating part) to be operated manually and assigned to the longitudinal dynamics management device does not supply an activation signal A=on for the longitudinal dynamics management device to the function unit. In general, further output of valid setpoint values is thus prevented in general by the safety functions if the ranges regarded as being controllable by the driver are exceeded.

The second function unit 11 can also output a shutdown signal $S1_{ab}$ or $S2_{ab}$ to the engine to prevent the implementation of the longitudinal dynamics management setpoint value $M_{set}$ currently being output when the brake pedal signal BP indicates activation of the brake by the driver or when an accelerator pedal angle FP greater than zero (corresponding to the accelerator pedal being operated) is ascertained in the case of a longitudinal dynamics management setpoint value $M_{set}$ in the form of a braking torque request (monitoring of the driver's decisive intervention).

In monitoring of acceleration and monitoring of jolts, different threshold values may be regarded as controllable, depending on different velocity ranges.

The present invention teaches the separation of safety functions from one another and from possible driving functions involving longitudinal dynamics. Here it is not the internal variables generated by the regulator responsible for driving functions nor is it other computation variables that are monitored but instead only the change in the regulator output quantity on the one hand and on the other hand the change in driving state resulting from the regulator output quantity (e.g., $a_{actual}$) that is monitored for driver controllability to identify faulty performance by the regulator and then initiate a safe state. An overall monitoring of the controllability of the driving performance, in particular the vehicle longitudinal performance, is possible through the quantities describing the vehicle response such as in particular the (vehicle) acceleration or jolts. The driving function unit and the safety function unit are advantageously encapsulated separately from one another, with the driving function unit being under the permanent control of the safety function unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinal dynamics management device for motor vehicles, comprising:

at least one first function unit with which predetermined driving functions are performed by output of a longitudinal dynamics management output signal; and a second function unit with which safety functions are performed, said second function unit being independent of the first function unit, wherein safety functions pertaining to driving functions performed by the second function unit are performed independently of internal operands of the first function unit, and wherein the second function unit performs the safety functions as a function of at least one of the output signal of the first function unit in the form of a longitudinal dynamics management setpoint value, and at least one input signal that reflects an actual vehicle response generated by the output signal of the first function unit.

2. The longitudinal dynamics management device of claim 1, wherein the second function unit performs as a safety function an acceleration monitoring associated with at least one of assessment of controllability of an actual vehicle acceleration, and assessment of controllability of a vehicle acceleration to be expected on the basis of the longitudinal dynamics management setpoint value.

3. The longitudinal dynamics management device of claim 2, wherein the second function unit detects the actual vehicle acceleration as an input signal reflecting the actual vehicle response, and the acceleration monitoring with regard to the controllability of the actual vehicle acceleration is performed independently of a setpoint acceleration.

4. The longitudinal dynamics management device of claim 2, wherein the second function unit detects the longitudinal dynamics management setpoint value as an input signal and performs the acceleration monitoring with regard to the controllability of the vehicle acceleration to be expected on the basis of the longitudinal dynamics management setpoint value.

5. The longitudinal dynamics management device of claim 2, wherein the second function unit outputs a shutdown signal to prevent the implementation of the longitudinal dynamics management setpoint value currently output when at least one of the actual vehicle acceleration and the vehicle acceleration to be expected on the basis of the longitudinal dynamics management setpoint value is outside of a predetermined acceleration range regarded as being controllable by the driver which is stored in the second function unit.

6. The longitudinal dynamics management device of claim 1, wherein the second function unit performs as a safety function a monitoring of jolts associated with at least one of an assessment of controllability of an actual change in vehicle acceleration, and an assessment of controllability of an expected change in vehicle acceleration on the basis of the longitudinal dynamics management setpoint value.

7. The longitudinal dynamics management device of claim 6, wherein the second function unit detects an actual vehicle acceleration as an input signal and performs the monitoring of jolts with regard to the controllability of the actual change in vehicle acceleration independently of a setpoint acceleration.

8. The longitudinal dynamics management device of claim 6, wherein the second function unit detects the longitudinal dynamics management setpoint value output by the first function unit as an input signal and performs the monitoring of jolts in the form of a setpoint value gradient monitoring with regard to the controllability of the change in vehicle acceleration to be expected on the basis of the longitudinal dynamics management setpoint value.

9. The longitudinal dynamics management device of claim 6, wherein the second function unit outputs a shutdown signal to prevent the implementation of the currently output longitudinal dynamics management setpoint value when the gradient of the actual vehicle acceleration is greater than a predetermined acceleration gradient threshold value.

10. The longitudinal dynamics management device of claim 6, wherein the second function unit outputs a shutdown signal to prevent the implementation of the longitudinal dynamics management setpoint value currently being output when the gradient of the longitudinal dynamics management setpoint value is greater than a predetermined setpoint threshold value.

* * * * *